United States Patent [19]

Kunter et al.

[11] Patent Number: 4,578,163
[45] Date of Patent: Mar. 25, 1986

[54] GOLD RECOVERY PROCESS

[75] Inventors: Richard S. Kunter, Lakewood; John R. Turney, Arvada, both of Colo.

[73] Assignee: Homestake Mining Company, San Francisco, Calif.

[21] Appl. No.: 677,455

[22] Filed: Dec. 3, 1984

[51] Int. Cl.⁴ .............................................. C25C 1/20
[52] U.S. Cl. .................................... 204/110; 75/110; 75/115; 75/118 R
[58] Field of Search ................... 204/109, 110; 75/100, 75/101 R, 115, 118 R

[56] References Cited

U.S. PATENT DOCUMENTS

| | | | |
|---|---|---|---|
| 2,777,764 | 1/1957 | Hedley et al. | 75/105 |
| 3,316,059 | 4/1967 | Vizsolyi et al. | 23/125 |
| 3,920,403 | 11/1975 | Ross | 204/110 |
| 4,004,991 | 1/1977 | Veltman et al. | 204/119 |
| 4,289,532 | 9/1981 | Matson et al. | 75/105 |

OTHER PUBLICATIONS

U.S. Defensive publication T104,001 Richard S. Kunter, Mar. 6, 1984 Method for Recovering Gold from Refractory Ores Appln No. 536,222.
R. S. Kunter et al. (1984) International Precious Metals Symposium Metallurgical Society of AIME and Int. Precious Metals Institute.
Hall (1974) World Min. 27:44–49.
Davidson et al. (1979) J. S. Afr. Inst. Min. Metall. 79:281–297.

*Primary Examiner*—R. L. Andrews
*Attorney, Agent, or Firm*—Townsend & Townsend

[57] ABSTRACT

A process for treating refractory ores combines pressure oxidation treatment of the ore with cyanidation and carbon-in-pulp recovery. Pressure oxidation is carried out under acidic conditions, at elevated temperatures and pressure. Before cyanidation, the oxidized slurry is subjected to a multiple stage washing operation to remove excess acid and heavy metals generated during the pressure oxidation. Such heavy metal removal lowers the subsequent cyanide usage and makes the process more economical. Cyanidation is carried out in a conventional manner, and it has been found that carbon-in-pulp recovery leads to greatly enhanced recovery of gold when compared to other conventional methods, such as zinc precipitation.

22 Claims, 7 Drawing Figures

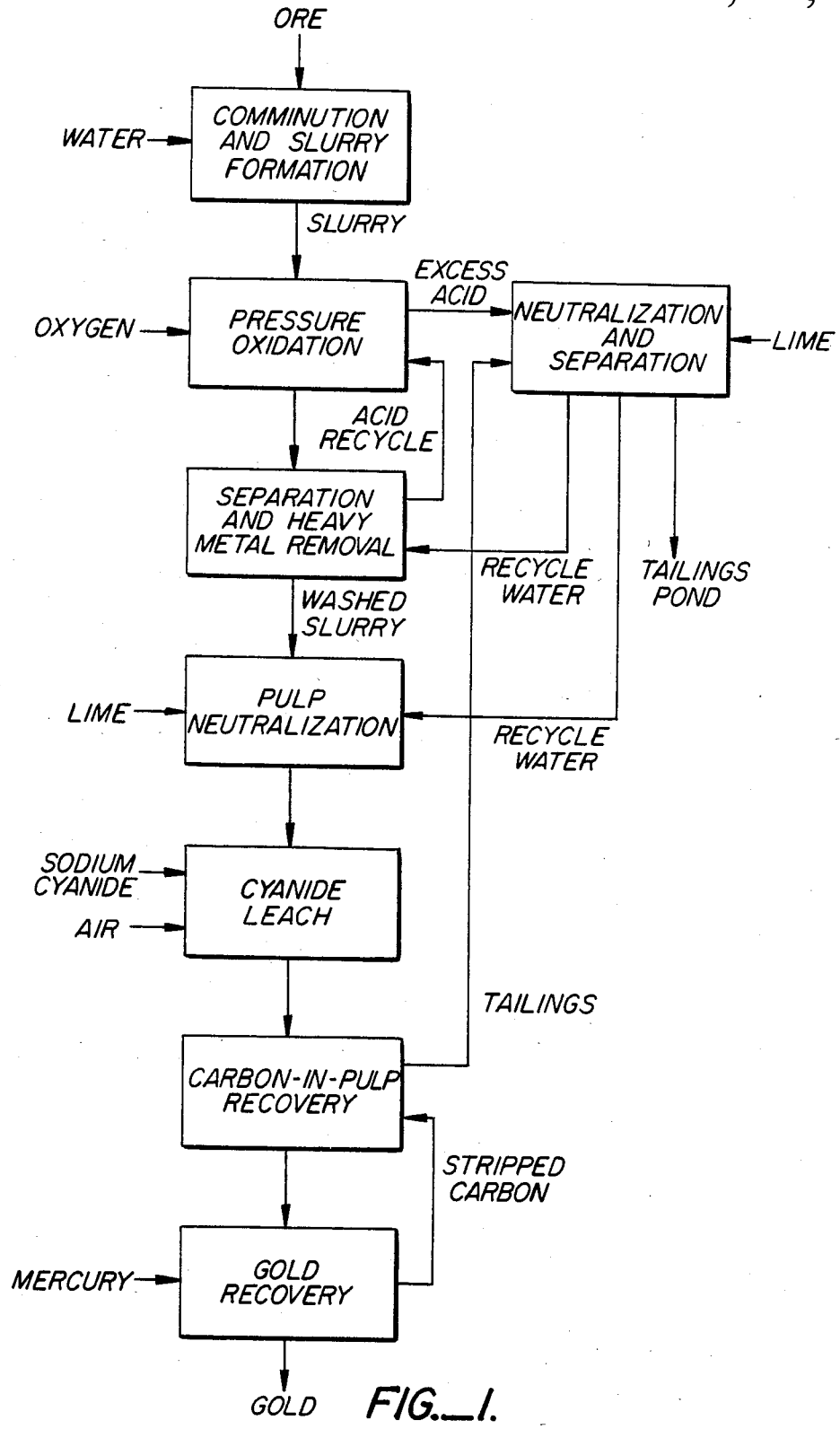
FIG._1.

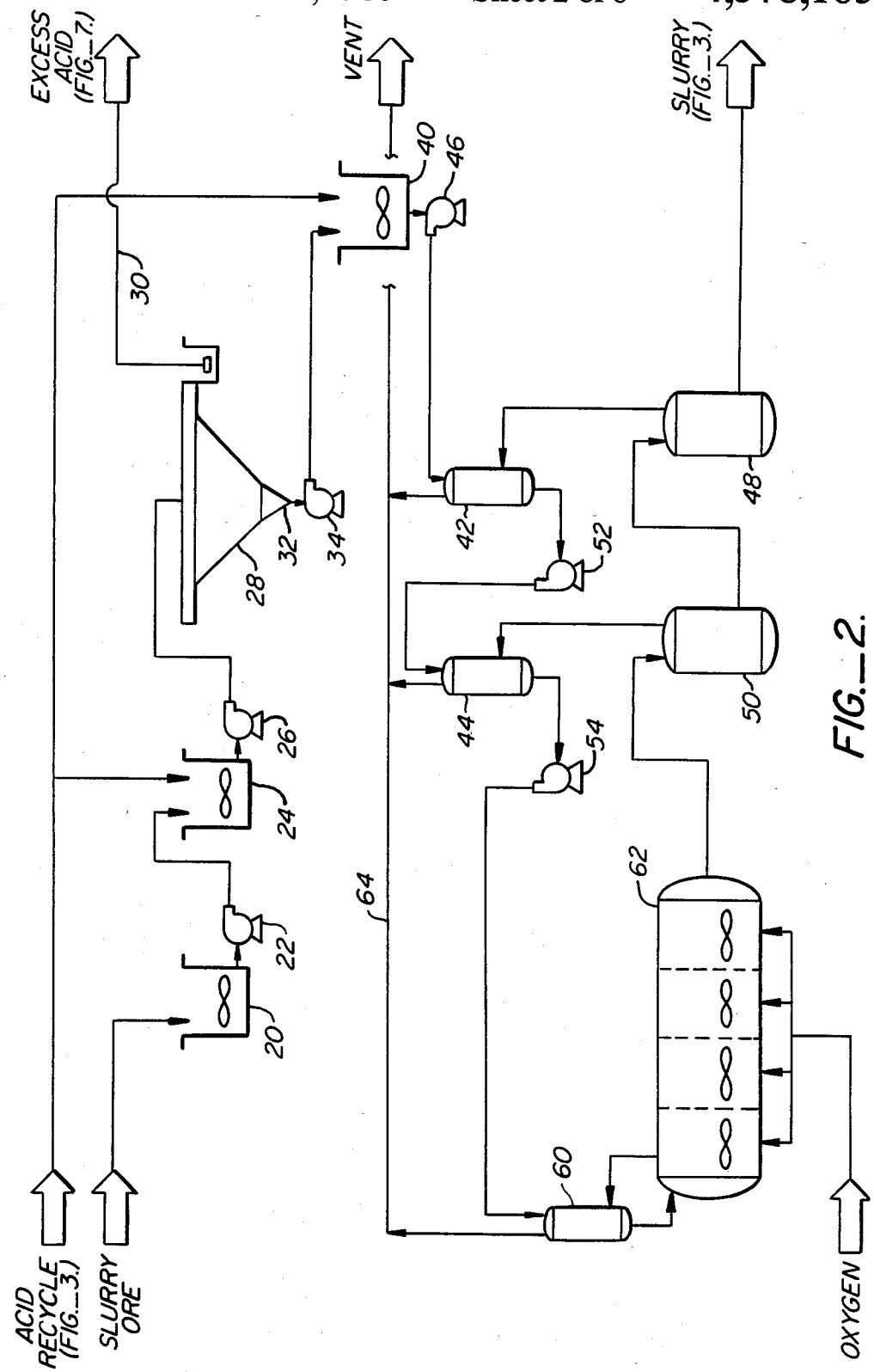
FIG._2.

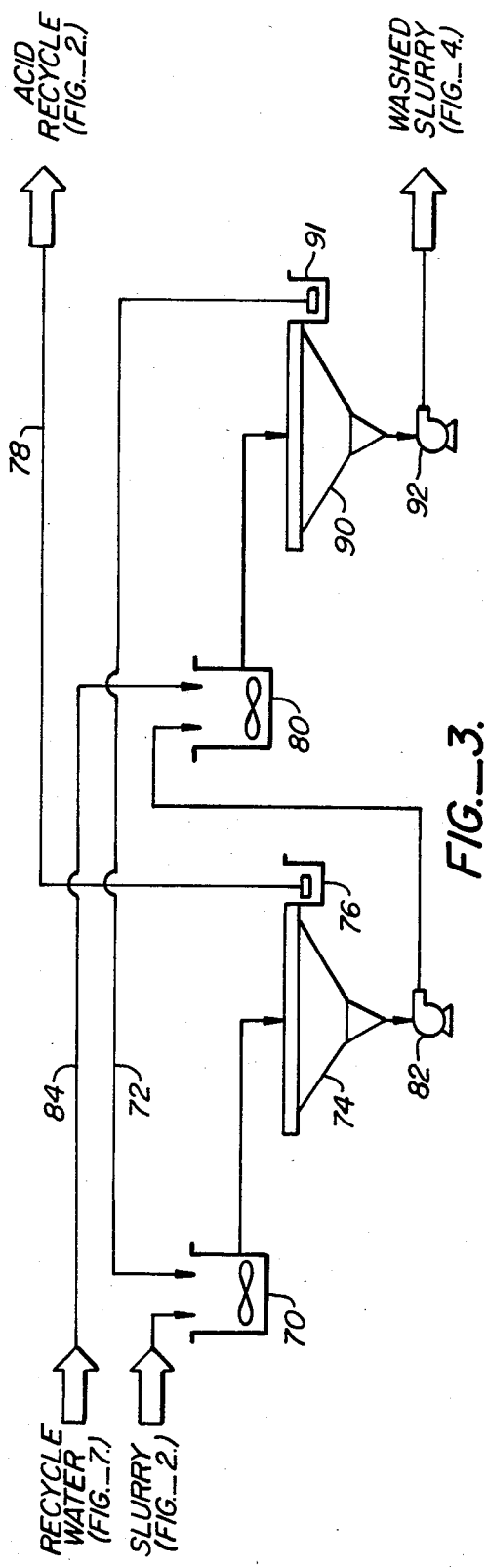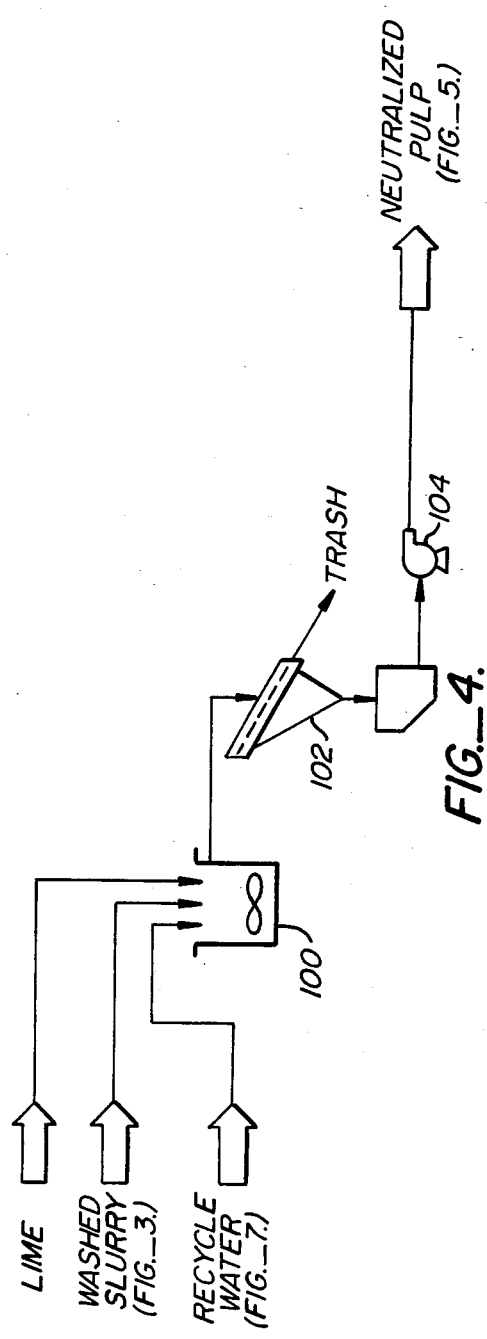

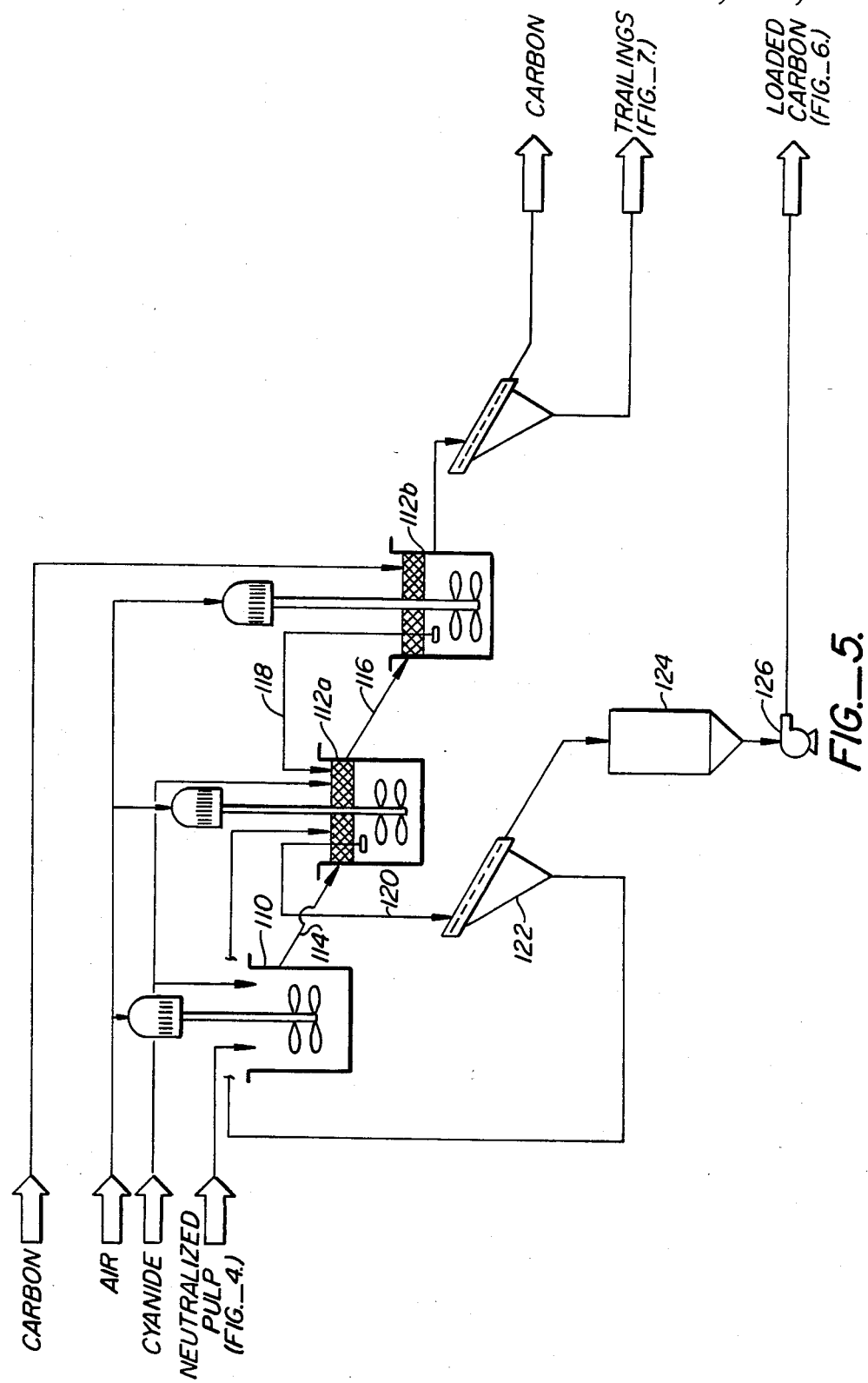

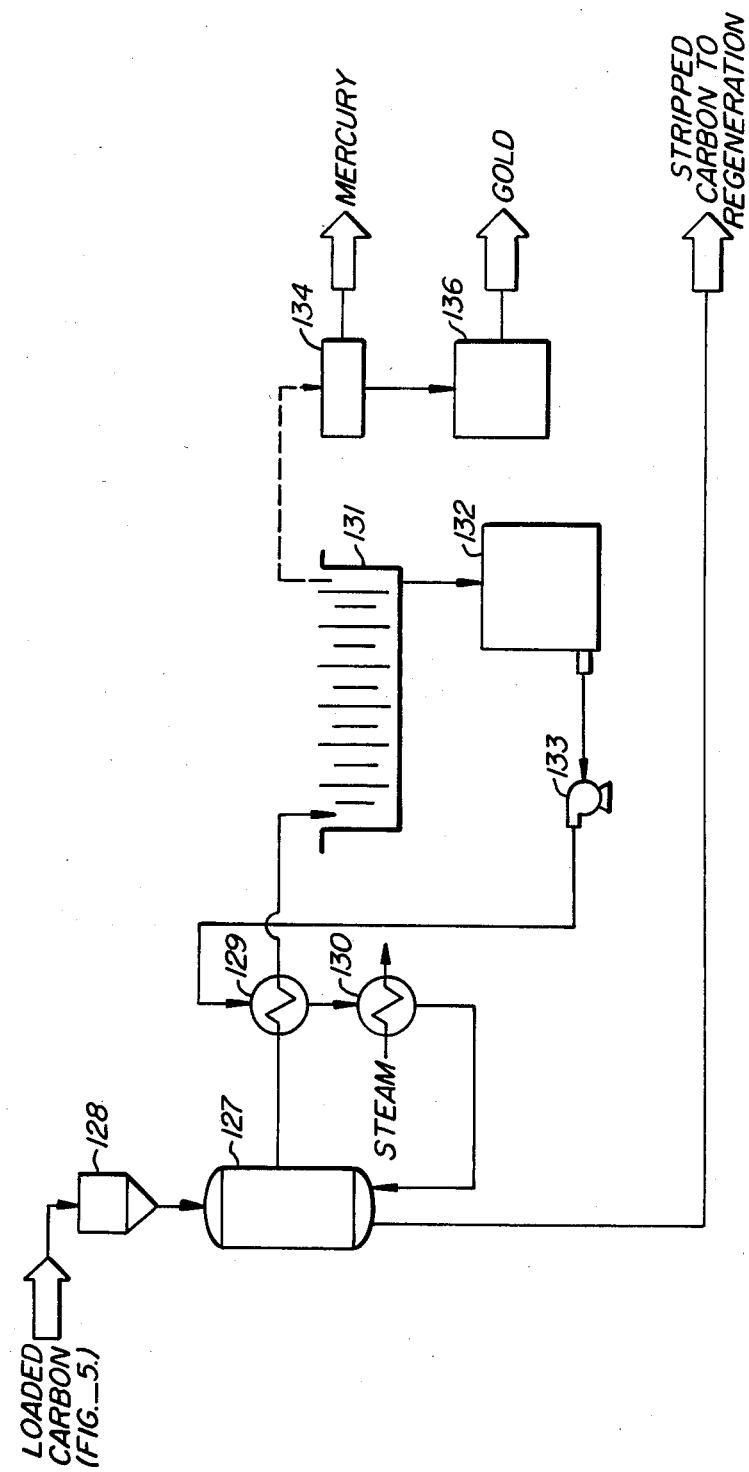
FIG._6.

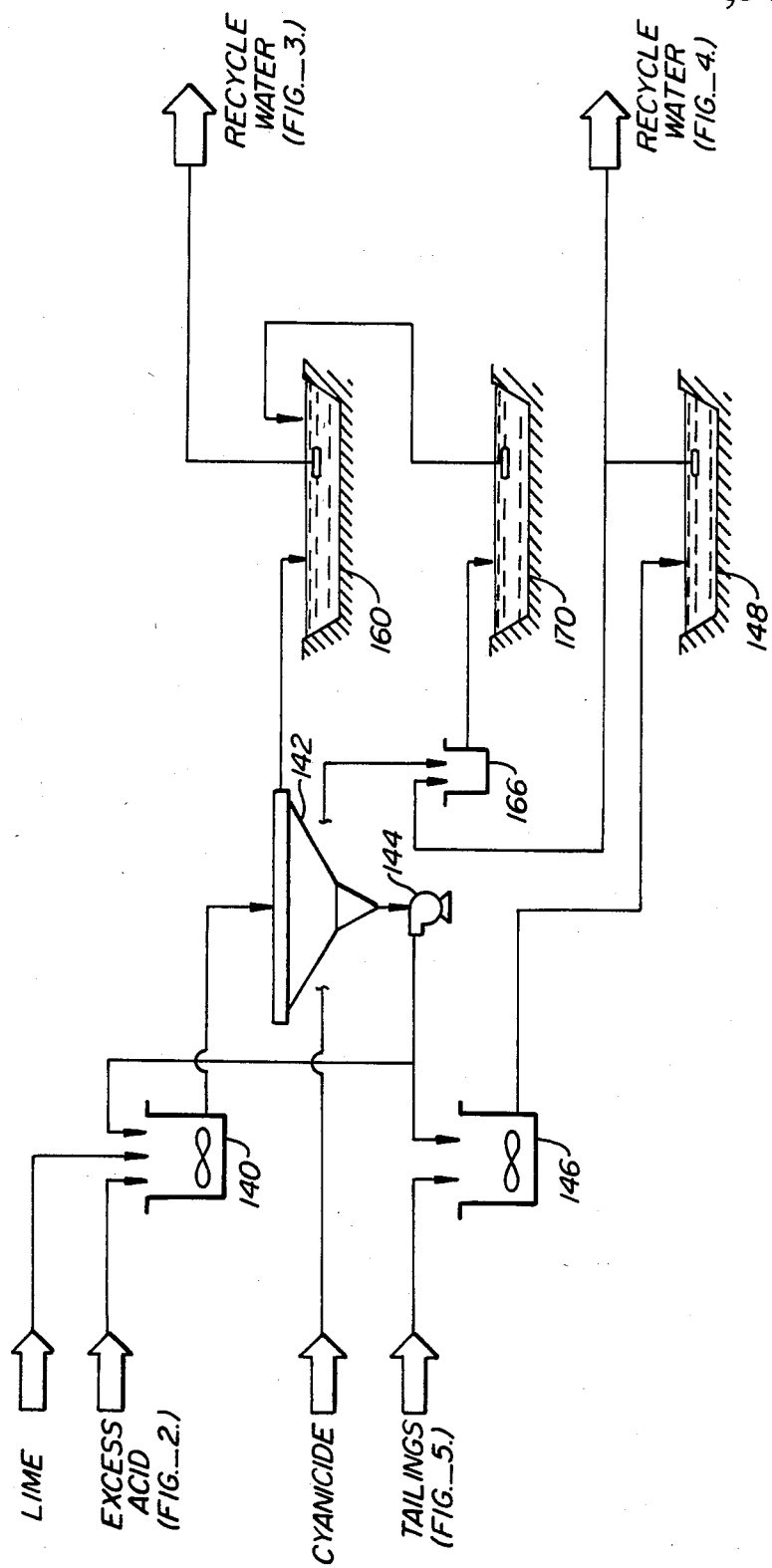
FIG._7.

GOLD RECOVERY PROCESS

BACKGROUND OF THE INVENTION

1. Field of the Invention

The present invention relates generally to the recovery of gold from refractory ores, and more particularly it relates to a novel treatment method which combines pressure oxidation of the ore, followed by cyanidation and carbon-in-pulp separation of the gold from the cyanidation pulp. The method is made practical by removal of heavy metals which were released during the pressure oxidation prior to cyanidation. Such heavy metals are cyanicides which can cause excessive cyanide consumption.

Conventionally, gold is recovered from gold bearing ores by cyanidation with a cyanide salt, typically sodium cyanide. Such treatment results in the formation of sodium aurocyanide, which is soluble and remains in solution until the gold is precipitated, typically with zinc. The precipitate is refined to yield the desired gold metal.

Unfortunately, many gold-bearing ores (referred to generally as "refractory ores") resist conventional cyanidation recovery, resulting in unacceptably high residual gold in the processed ore. A number of mechanisms may contribute to the refractory nature of a gold-bearing ore. For example, the gold may be occluded within various mineral formations, such as pyrites, arsenopyrites, sulfosalts, and the like. With such mineral locking, cyanide attack on the portion of the gold in the ore is prevented, and cyanidation is unable to solubilize that portion of the gold content. The gold ores including a significant amount of carbonaceous material are also known to be resistant to cyanidation. In some cases, the gold is chemically combined with the carbonaceous material in a manner which resists attack by the cyanide ion. Alternatively, the aurocyanide ion can be adsorbed onto the carbonaceous material during cyanidation, preventing separation from the ore. A third refractory mechanism occurs in clay ores, where the clay adsorbs the aurocyanide after it is released in the cyanidation step. Such clay adsorption inhibits ultimate separation of the aurocyanide ion from the treated ore slurry.

2. Description of the Prior Art

Various pretreatment processes have been proposed to release the gold from refractory ores prior to cyanidation. The use of chlorine or sodium hypochlorite generated in situ by electrolysis of brine has been taught to chemically oxidize carbonaceous ores. Scheiner et al., "Investigation of Oxidation Systems for Improving Gold Recovery from Carbonaceous Materials," Bureau of Mines Technical Progress Report (Heavy Metals Program), Department of Interior, July 1968. U.S. Pat. No. 2,777,764 to Hedley et al. discloses a pressure oxidation process for releasing gold which is occluded in sulfide minerals in the ore. The method consists of pretreating the ore in a non-alkaline oxidizing medium under pressure and at a high temperature. See also, U.S. Pat. No. 3,316,059 and 4,004,991 which concern the acid oxidation of zinc and iron ores. U.S. Pat. No. 4,289,532 describes an improved cyanidation gold recovery technique where the gold ore is oxidized and simultaneously subjected to cyanidation and counter current granular activated carbon adsorption in two or more stages.

Carbon-in-pulp processes for recovering gold values from very finely divided ore obtained from the grinding circuits have been used for some time. See, e.g., Hall (1974) World Min. 27:44–49, and Davidson et al. (1979) J. S. Afr. Inst. Min. Metall. 79:281–297.

SUMMARY OF THE INVENTION

The present invention provides for the improved recovery of gold from refractory gold ores through a novel combination of pressure oxidation of the ore, followed by cyanidation and (typically) carbon-in-pulp recovery. It has been found that gold ores which have been subjected to pressure oxidation are broken down into very fine oxidation pulps. Although the gold in such fine oxidation pulps is released from mineral locking and carbonaceous adsorption, pressure oxidation pulps are resistant to conventional recovery techniques, such as cyanidation followed by zinc precipitation. The use of carbon-in-pulp recovery techniques greatly enhances the ultimate gold recovery from such pressure oxidation pulps. In order to make the combined pressure oxidation and carbon-in-pulp recovery practical and economic, it has been found that heavy metals and sulfates which are released into the pressure oxidation pulp must be removed prior to cyanidation. Such heavy metals and sulfates, apparently act as cyanicides and reduce the amount of available cyanide ion, greatly increasing overall cyanide consumption unless they are removed. While it might have been expected that oxidation of the heavy metals and sulfides would have rendered them less reactive with the cyanide ion, this did not turn out to be the case. It was found in treating a particular sulfide ore, cyanide usage was decreased by over two-thirds by separation of the oxidized heavy metals and sulfates. In large processing facilities, this decrease can result in savings of hundreds of thousands of dollars each year.

In the preferred embodiment, the heavy metal separation is achieved in at least two stages, each consisting of washing and clarification. The pressure oxidation pulp is first admixed with a large volume of an aqueous diluent, typically water recycled from elsewhere in the process. The diluent will be lean in the heavy metals and sulfates, and the majority of heavy metals and sulfates in the pulp remain in solution. By then separating the pulp residue from the excess liquid, a separation of the heavy metals is effected. The gold, which is present in elemental form, remains in the pulp where it is ultimately recovered by cyanidation and carbon-in-pulp recovery. The degree of heavy metal removal is determined by the relative amount of diluent added, the concentration of heavy metals in the recycled diluent, and the number of separation stages.

BRIEF DESCRIPTION OF THE DRAWINGS

FIG. 1 is a block diagram illustrating the process flow streams among the unit operations of the present invention.

FIG. 2 is a flow diagram of the pressure oxidation unit operation.

FIG. 3 is a flow diagram of the separation and heavy metal removal unit operation.

FIG. 4 is a flow diagram of the pulp neutralization unit operation.

FIG. 5 is a flow diagram of the cyanide leach and carbon-in-pulp recovery unit operations of the present invention.

FIG. 6 is a flow diagram of the electrolytic carbon desorption unit operation of the present invention.

FIG. 7 is a flow diagram of the neutralization and separation unit operation of the present invention.

DESCRIPTION OF THE PREFERRED EMBODIMENT

Referring to FIG. 1, the preferred process of the present invention is carried out in eight separate treatment steps, commonly referred to as unit operations. First, the gold-bearing ore is comminuted and mixed with water to form a slurry. The slurry is then treated by pressure oxidation, typically in an autoclave under acidic conditions with the addition of oxygen. Such pressure oxidation releases elemental gold from the sulfide locking by oxidizing or passivating the carbon, avoids carbonaceous adsorption which would otherwise inhibit the gold recovery. The resulting oxidized slurry is next directed to a separation operation where heavy metal species released during the pressure oxidation are removed. Excess acid from this stage is recycled to the pressure oxidation.

After removal of the heavy metals, the washed slurry containing the residual gold is directed to a pulp neutralization operation. Here, a strong base, such as lime, is added to increase the pH of the slurry to allow for subsequent cyanide leaching. Cyanide leaching is carried out in a conventional manner, followed by carbon-in-pulp recovery of the soluble aurocyanide complexes released during cyanidation. Finally, gold is recovered from the activated carbon in a conventional electrolytic separation. Means are provided for neutralizing and recycling the various process streams to allow for sufficient, economic, and environmentally-acceptable operation.

Comminution and slurry formation of the ore is carried out by conventional processing methods. Conveniently, ore from the mine will be first crushed in a jaw crusher, cone crusher, or similar apparatus capable of breaking down very large aggregates of ore. The crushed ore is then further comminuted, typically by grinding with water in a sag mill followed by final grinding with water in a ball mill. The resulting ore slurry typically has a water content of from 50 to 60 weight percent, and may be fed directly to the pressure oxidation area by a slurry pipeline.

Referring now to FIG. 2, the ore slurry from the crushing operation will be directed to a surge tank 20 at the front end of the pressure oxidation operation. A transfer pump 22 will direct the slurry to a preoxidation tank 24, where the slurry is admixed with an acid stream recycled from the separation and heavy metal removal operation, as described hereinafter. After addition of the acid recycle, the solids content is reduced to about 10% to 20%, and the pH is reduced to about 3 to 4. The acid slurry is then directed by transfer pump 26 to a preoxidation thickener 28, typically a gravity thickener or other clarifier. The thickener 28 separates an excess acid stream 30 and a residue stream 32. The solids content in the residue stream 32 is about 45% to 55%, while the pH remains at about 3 to 4. The excess acid stream 30 which also contains solubilized heavy metals is substantially free from solids and directed to the neutralization and separation operation, as will be described hereinafter. The residue stream 32 is directed by transfer pump 34 to the oxidation tank 40, where additional sulfuric acid may be added, particularly during start-up when no excess acid has been generated for recycling.

The slurry having an adjusted solids content of approximately 40% to 45% is fed to preheater 42 and 44 by transfer pump 46. The preheaters 42 and 44 are conventional heat exchangers which receive steam from the overheads of flash tanks 48 and 50, respectively. A third preheater 60 is provided to receive the steam overhead from autoclave 62 and the overheads from each of the preheaters 42, 44 and 60 are collected in a manifold 64 and vented to the atmosphere.

The pressure oxidation of the present invention is carried out in a pressure vessel, typically autoclave 62 having a plurality of agitated compartments. Oxygen is injected into each of the compartments, and the resultant oxidation of the sulfides in the ore under acidic conditions is highly exothermic. Alternative oxidants, such as ozone, hydrogen peroxide, soldium hypochlorite, and the like, could be employed although probably at greater expense. Although the precise operating conditions are not critical, the following parameters have been found to be optimum with the particular ore body described in the Experimental section hereinafter when oxygen is used as the oxidizing agent.

| Parameter | Operating Parameters | |
|---|---|---|
| | Broad Range | Narrow Range |
| Temperature | 140–200° C. | 160–180° C. |
| Pressure | 140–300 psig | 180–200 psig |
| Retention Time | 1 to 4 hrs. | 1.5–2 hrs. |
| Pulp Density | 40–50% | 40–45% |
| Final Acidity | 5–20 g/l $H_2SO_4$4 | 7–15 g/l $H_2SO_4$ |
| Final emf | 420 mv (SCE) min. | 420 mv (SCE) min. |

A detailed discussion of the pressure oxidation operation of the present invention is provided in Defensive Publication T104,001 dated Mar. 6, 1984. Such disclosure is incorporated herein by referenced.

The oxidized slurry leaving autoclave 62 enters the flash tanks 50 and 48 in series. Steam flashed from the slurry is used as the heating medium and preheaters 44 and 42, respectively. Note that temperature control in the autoclave is maintained by properly controlling the oxygen addition, usually within the range from 70% to 150% of the stoichiometric oxygen requirement.

Turning now to FIG. 3, the separation and heavy metal removal operation will be described. The purpose of this operation is to lower the heavy metal content of the ore slurry prior to cyanidation. It has been found that heavy metals, such as nickel, cobalt, copper, zinc and iron are liberated from the ore during the pressure oxidation operation. Such heavy metals, in their oxidized states, act as cyanicides, forming highly stable complexes when exposed to the cyanide anion. Thus, these metals are able to tie up the free cyanide introduced in the cyanidation step, greatly increasing the cyanide requirement. In addition to removing such cyanicides, the separation and heavy metal removal operation results in a reduction in free acid content. This is desirable since the cyanidation reaction must be carried out under alkaline conditions.

The heavy metal separation is typically carried out in a multiple stage washing operation, as illustrated in FIG. 3. Slurry discharged from flash tank 48 enters an agitated tank 70 where it is mixed with a recycled liquid stream 72, whose source will be described hereinafter. The solids content of the slurry is reduced to about 10% by weight, and the resulting low solids slurry is directed to a thickener 74. The thickener may be any type of conventional clarification device used for separating large volumes of solid and liquid, typically being a gravity thickener. The overhead stream from the thickener 74 is collected in a trough 76 and directed back to the pressure oxidation mix tanks 24 and 40 via acid recycle line 78. The underflow from the thickener 74, having a restored solids content of approximately 40% to 45%, is directed to a second agitated tank 80 by transfer pump 82. A recycle water stream 84 from the neutralization and separation operation is also directed to the agitated tank 80, resulting in a dilution of the slurry to about 15 weight percent. The diluted slurry then enters a second gravity thickener 90 where the overflow and underflow are again separated. The overflow (trough 91) comprises the recycled stream 72 which is used to dilute the incoming slurry in agitated tank 70, as described previously. The washed slurry underflow, in turn, is transferred to the pulp neutralization operation by a transfer pump 92.

The multiple stage washing and clarification operation provides a number of benefits in addition to heavy metal and sulfate removal. Use of the acid recycle stream 78 in preoxidation thickener 28 provides the acid required to lower the pH of the ore slurry in autoclave 62. In the same way, ferric ion released during the pressure oxidation operation is recycled to the autoclave 62. Removal of sulfate from the washed slurry helps prevent the formation of gypsum (CaSO4) during cyanidation, when the pH is raised. Similarly, the formation of metal hydroxides at the higher pH is reduced by removal of the metal ions released during pressure oxidation. Such metals would also interfere with carbon-in-pulp recovery by occupying adsorption sites which are needed for adsorption of the soluble aurocyanide complexes. Finally, in some cases it might be desirable to recover the solubilized metals. Separation of the metal ions prior to the cyanidation operation would facilitate such recovery.

The washing operations just described result in the removal of heavy metals and free acid content from the ore slurry which is about to be subjected to cyanidation. The heavy metals and acid, in turn, are returned to the pressure oxidation operation by recycle line 78. It will be appreciated that ultimate removal of the heavy metals and acid from the system occurs in excess acid removal line 30, emanating from the overflow of the preoxidation thickener 28. In the system as illustrated and described, the washed slurry which is transferred to the pulp neutralization operation will have approximately 90% of the heavy metal and free acid content removed. This figure, however, is not critical. The amount of heavy metals and free acid removed can be varied, either by adjusting the volume of wash water utilized in the stage of washing, or varying the number of washing stages utilized. Also, the washing could be accomplished using other sources of water, including other recycle streams or fresh water. The use of neutralized water from the neutralization and separation operation is, however, convenient under the particular circumstances.

The washed slurry from the separation in heavy metal removal operation must be adjusted to a pH in the range from about 10.5 to 11 prior to cyanidation. Referring to FIG. 4, the pH adjustment is effected in a neutralization tank 100 where the washed slurry from the separation and a heavy metal removal operation is mixed with lime (calcium carbonate) and recycle water from the neutralization and separation operation. The resulting pulp slurry, having a solids content of about 40 weight percent, is then directed to a trash separation screen 102 where aggregates larger than about 20 mesh (U.S. Sieve Series) are separated and removed. The resulting neutralized pulp is directed by transfer pump 104 to the cyanide leach operation.

The cyanide leach operation is conventional, employing a dilute solution of sodium cyanide to extract gold from the pulp. The reaction requires oxygen, and proceeds according to the following formula:

$$4Au + 8CN^- + O_2 + 2H_2O \rightarrow 4Au(CN)_2^- + 4OH^-$$

Continuous agitation and aeration of the incoming pulp is carried out in one or more cyanidation tanks 110 (only one being illustrated in FIG. 5). In the preferred embodiment, cyanide is added to the washed slurry to a final concentration of about 1 lb/ton of slurry. The cyanidation reactions are run continuously with a mean retention time of about 2 hours in each tank 110. Lime may be added to maintain the pH within the desired range, i.e., 10.5 to 11 pH. The cyanidation reactions continue in the carbon-in-pulp tanks 112, as described below.

Pulp from cyanidation tanks 110 containing the soluble aurocyanide ion $(Au(CN)_2^-)$ is directed to a plurality of carbon-in-pulp tanks 112. Although two tanks in series are illustrated, the process of the present invention will typically utilize four or more carbon-in-pulp tanks in series. The carbon-in-pulp tanks 112 are run in order to effect a counter current extraction of the soluble aurocyanide ion from the pump. Thus, the pulp is fed from the first tank 112a to the second tank 112b and to each successive tank in order. In addition, activated carbon is fed to the final tank in series (112b, as illustrated) and thereafter fed to each previous tank in the series. Activated carbon from the first tank 112a is then removed in transfer line 120 and fed to a screen separator 122.

The pulp first comes into contact with the activated carbon in the first adsorption tank 112a. Although any activated carbon can be used, it is preferred to use activated coconut carbon because it is harder than most other available types and it is more resistant to breakage and abrasion. The carbon used is about 6×16 mesh (U.S. Sieve Series) which is very easily separated from the much finer particles which comprise the pulp. The carbon particles are kept in suspension in the slurry by air and/or mechanical agitation where complex ions of gold and silver cyanides are adsorbed from the solution by the activated carbon. Carbon concentration in the adsorption tanks is controlled to about 15 grams per liter of pulp by controlling the rate of addition of reactivated carbon to the last tank in the circuit.

The adsorption circuit typically consists of four or more agitator tanks 112, each including a partially submerged separator screen at its upper end. Pulp is moved through the tanks from the first tank 112a through the last tank, while the activated carbon contained in a small amount of pulp is moved counter to the pulp flow through transfer line 118. Alternatively, the pulp and carbon mixture is elevated by outside airlifts from each tank to vibrating screens external to the tanks. The pulp is separated from the carbon when it flows through the screens and the carbon is retained on the tops of the screens. The carbon is split as it flows from the screens so that most of it drops back into the same agitator tank, while a predetermined amount is advanced to the next tank (counter current) in the series.

Dissolved gold values are lowered as the pulp flows through each succeeding tank in the circuit until it reaches the final tank. The pulp which flows from the final tank (112b, as illustrated) is considered the tailings, and is disposed of appropriately. The loaded carbon leaving first tank 112a is directed to the vibrating screen 122, where the carbon is separated from residual pulp. The pulp is recycled to the first adsorption tank 112a, while the carbon is directed to a surge tank 124. The transfer pump 126 then directs the load of carbon to the gold recovery operation as needed.

When cyanide is added to the washed slurry (gold bearing mineral pulp), the gold is solubilized as a gold cyanide complex and the economic value is in the solution and not the ground rock. In the carbon-in-pulp method, the gold cyanide complex is directly adsorbed onto granular sized carbon admixed with the pulp. The carbon can be subsequently screened from the pulp and does not require the separation of the aqueous phase from the pulp. Alternatively, the gold-bearing aqueous phase may be separated from the barren ground rock by direct filtering or by a counter current decantation washing system (not illustrated).

In the direct filtration method, the rock pulp containing the gold bearing aqueous phase is passed over filters where the gold bearing solution is drawn off typically by a vacuum. The filtered pulp is subsequently repulped with barren solution and re-filtered to dilute any entrained gold bearing solution. The first filtrate, which is the highest in gold values, is called the pregnant solution and typically goes to a Merrill-Crowe type precipitation circuit. A Merrill-Crowe type precipitation circuit typically consists of the following: clarification filters to reduce the total suspended solids to less than 5 ppm; a deaeration tower to remove dissolved oxygen; the addition of finely divided zinc as an emulsion (often with a soluble lead salt in a ratio of 10 zinc to 1 lead) into the clarified deaerated pregnant solution; precipitate filters to remove the excess zinc, and gold slimes from the barren solution.

In the counter current decantation (CCD) method, the rock pulp containing the gold bearing aqueous phase is mixed with the overflow from the second thickener and settled in the first thickener. The solution overflow from the first thickener, which is the highest in gold values, is called the pregnant solution and typically goes to a Merrill-Crowe type precipitation circuit. The pulp from the first thickener goes to the second thickener and is mixed with the solution overflow from the third thickener. The pulp going to the final thickener in the series is mixed with barren solution or fresh water. The net effect of the CCD circuit is to successively dilute and wash the ground rock pulp free of entrained gold-bearing solutions.

Referring now to FIG. 6, the gold recovery operation typically relies on a modified Zadra process, which process is generally described in Report of Investigations 4672, U.S. Department of the Interior, April 1950. The stripping process relies on reversing the equilibrium between adsorption and desorption to drive the gold back into solution and deposit the gold electrolytically on steelwool cathodes. The circuit consists of a strip column 127 which is fed loaded carbon by a measuring tank 128. The gold and silver are stripped from the carbon by bottom flooding the strip column 127 with a hot caustic cyanide solution. The solution includes about 1% sodium hydroxide and 0.2 weight percent sodium cyanide, and is typically at a temperature of about 120° C. to 130° C. Conveniently, the strip solution may be preheated in an exchanger 129, which utilizes the discharged solution as a heat source. Final heating is accomplished by a second exchanger 130, typically utilizing steam as the heat source. After a sufficient time to strip the gold from the carbon, typically about 8 to 24 hours, the carbon is washed in hot fresh water, followed by a cold water wash to remove the remaining solution from the carbon.

From the strip column, the pregnant caustic solution is directed to an electrolytic cell 131, where the gold and silver are plated on cylindrical or rectangular steelwool cathodes. Each cell consists of a fiberglass tank which contains a cathode and a stainless steel screen anode. The gold and silver are plated on the cathodes as the caustic solution is continuously recycled to the stripping column through the holding tank 132 and transfer pump 133.

The gold may be recovered from the loaded cathodes conventionally after any mercury which has been stripped from the carbon is recovered in a mercury retort 134. The gold is then refined in a conventional furnace 136 to obtain gold and silver dore bars.

The stripped carbon from the strip column 127 is then recycled to a reactivation plant (not illustrated). The carbon adsorbs materials other than gold and silver, and some of these materials are not removed when the gold is desorbed. Therefore, a resultant loss of activity occurs after extended use and the carbon must be periodically reactivated. Reactivation is accomplished by heating the carbon in the absence of air to a temperature of about 600° C. for a period of about 0.5 to 1 hour. Such high temperatures drive off most of the impurities and restore the activity of the carbon. Typically, a kiln or other suitable heating apparatus may be utilized. Additionally, an acid wash treatment may be utilized to further remove metals adsorbed onto the carbon.

Referring now to FIG. 7, a plant constructed in accordance with the present invention will typically include a neutralization and separation operation for neutralizing and recycling the various process streams. The excess acid generated in the pressure oxidation operation is directed to a neutralization tank 140, where it is neutralized with lime. The neutralized stream is then directed to a precipitation thickener 142, where the precipitated solids are separated from the liquid effluent. Solids are directed by transfer pump 144 to a tailings sump tank 146, where they are mixed with the tailing from the carbon-in-pulp operation. The combined streams are then directed to a tailings pond 148.

The effluent from the precipitation thickener 142 is directed to a cooling pond 160. Water from the cooling pond 160, in turn, serves as the source of recycle water utilized in the separation and heavy metal removal unit operation.

Water from the tailings pond 148 is utilized as a source of recycle water for the pulp neutralization operation. The water is also directed to a mixing tank 166, where it is mixed with a cyanicide (e.g., chlorine), and then directed to a reclaimed treatment pond 170. Water from the reclaimed treatment pond is then transferred to the cooling pond 160, and the circuit is complete.

The process of the present invention provides high levels of gold recovery, particularly on gold ores which are subject to sulfide locking and carbonaceous adsorption.

Although the foregoing invention has been described in some detail by way of illustration and example for purposes of clarity of understanding, it will be obvious that certain changes and modifications may be practiced within the scope of the appended claims.

What is claimed is:

1. A process for recovering gold from an aqueous slurry formed from a refractory ore where said gold is subject to sulfide locking and adsorption on carbonaceous matter, said process comprising:

oxidizing the aqueous slurry in an autoclave under acidic conditions at an elevated temperature and pressure whereby elemental gold is released from the sulfide locking and carbonaceous adsorption and heavy metals present in the ore are solubilized;

separating the solubilized heavy metals from the oxidized aqueous slurry to form an acid liquid fraction containing the majority of the heavy metals and a solids fraction containing the gold ore;

recycling a portion of the acid liquid fraction to the autoclave to provide a source of acid for the oxidation;

disposing of the remaining portion of the liquid fraction to remove excess heavy metals and acid from the process;

dissolving the elemental gold in the solids fraction by exposure to cyanide to form a soluble gold-cyanide complex; and recovering elemental gold from the gold-cyanide complex.

2. A process as in claim 1, wherein the slurry is oxidized by introducing oxygen to the slurry, heating the slurry to a temperature in the range from about 140° to 220° C.; maintaining a pressure of at least 140 psig, and maintaining a final acidity of at least 5 g/l $H_2SO_4$.

3. A process as in claim 1, wherein the gold-cyanide complex is recovered by adsorption on activated carbon.

4. A process as in claim 1, wherein the solubilized heavy metals are separated from the oxidized aqueous slurry by washing the slurry and physically separating the washed slurry from excess liquid, whereby the heavy metals are removed with the excess liquid.

5. A process as in claim 4, wherein the slurry is washed and separated at least twice to separate the heavy metals.

6. A process as in claim 5, wherein the slurry is washed by dilution with water and is separated in a clarifier.

7. A process as in claim 6, wherein a flocculant is added to the slurry prior to separation in the clarifier.

8. A process as in claim 1, wherein the elemental gold is dissolved by exposure to a cyanide salt under alkaline conditions with the addition of oxygen.

9. A process as in claim 3, wherein the gold-cyanide complex is adsorbed on the activated carbon in an agitated tank with air addition.

10. A process as in claim 9, wherein there are at least two agitated tanks in series.

11. A process as in claim 3, wherein the elemental gold is recovered from the activated carbon by washing of the carbon with an aqueous caustic cyanide solution, followed by electrowinning.

12. A process for recovering gold from a refractory ore where said gold is subject to sulfide locking and adsorption on carbonaceous matter, said process comprising:

comminuting the ore to a preselected size;

forming an acidified aqueous slurry by combining said comminuted ore with an acid and heavy metal recycle stream;

separating the acidified aqueous slurry into an excess acid stream and a residue stream, where said excess acid stream contains solubilized heavy metals and said residue stream contains the gold;

separating the heavy metals from the excess acid stream and neutralizing the acid in the excess acid stream to form a recycle water stream;

oxidizing the residue stream from the acidified aqueous slurry under acidic conditions at an elevated temperature and pressure whereby elemental gold is released from the sulfide locking and carbonaceous adsorption and heavy metals present in the ore are solubilized;

separating the oxidized slurry into a liquid fraction substantially free from solids and a residue fraction containing substantially all of the solids, which liquid fraction serves as the source of the acid and heavy metal recycle stream, whereby the gold is contained in the residue fraction and the majority of heavy metals are in the liquid fraction;

dissolving the elemental gold in the residue fraction of the aqueous slurry by exposure to cyanide to form a soluble gold-cyanide complex;

adsorbing the gold-cyanide salt on activated carbon; and recovering elemental gold from the activated carbon.

13. A process as in claim 12, wherein the slurry is oxidized by introducing an oxidizing agent to the slurry, heating the slurry to a temperature in the range from about 140° to 220° C.; maintaining a pressure of at least 140 psig, and maintaining a final acidity of at least 5 g/l $H_2SO_4$.

14. A process as in claim 13, wherein the oxidizing agent is selected from the group consisting of oxygen, ozone, hydrogen peroxide, and sodium hypochlorite.

15. A process as in claim 12, wherein the liquid fraction and residue fraction are separated in a washing circuit comprising a plurality of clarifiers in series where the recycle water stream is used to wash the fractions.

16. A process as in claim 15, wherein the oxidized slurry is diluted with water from the recycle stream prior to introduction to the first clarifier.

17. A process as in claim 16, wherein the oxidized slurry is diluted approximately 3:1 by weight with water from the recycle stream at each stage of clarification.

18. A process as in claim 17, wherein a flocculant is included in the recycle dilution stream.

19. A process as in claim 12, wherein the elemental gold is dissolved by exposure to a cyanide salt under alkaline conditions with the addition of oxygen.

20. A process as in claim 12, wherein the gold-cyanide complex is adsorbed on the activated carbon in an agitated tank with air addition.

21. A process as in claim 20, wherein there are at least two agitated tanks in series.

22. A process as in claim 12, wherein the elemental gold is recovered from the activated carbon by washing of the carbon with an aqueous caustic cyanide solution, followed by electrowinning.

* * * * *